United States Patent
Fügel et al.

(10) Patent No.: US 9,651,085 B2
(45) Date of Patent: May 16, 2017

(54) MOBILE CONCRETE PUMP AND PRODUCTION METHOD

(71) Applicant: Putzmeister Engineering GmbH, Aichtal (DE)

(72) Inventors: Dietmar Fügel, Wolfschlugen (DE); Karl Westermann, Walddorfhäslach (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 14/873,247

(22) Filed: Oct. 2, 2015

(65) Prior Publication Data

US 2016/0025128 A1    Jan. 28, 2016

Related U.S. Application Data

(63) Continuation of application No. PCT/EP2014/056353, filed on Mar. 28, 2014.

(30) Foreign Application Priority Data

Apr. 3, 2013 (DE) ........................ 10 2013 205 888

(51) Int. Cl.
*B60S 9/02* (2006.01)
*F16C 11/04* (2006.01)
(Continued)

(52) U.S. Cl.
CPC ................. *F16C 11/04* (2013.01); *B60S 9/02* (2013.01); *B66C 23/80* (2013.01); *E04G 21/0436* (2013.01); *E04G 21/0445* (2013.01)

(58) Field of Classification Search
CPC . F16C 11/04; B60S 9/02; B66C 23/80; E04G 21/0436
See application file for complete search history.

(56) References Cited

U.S. PATENT DOCUMENTS

| 4,394,913 A | 7/1983 | Lanning et al. |
| 4,624,357 A | 11/1986 | Oury et al. |

(Continued)

FOREIGN PATENT DOCUMENTS

| CN | 201292227 Y | 8/2009 |
| DE | 31 43 782 A1 | 6/1982 |

(Continued)

OTHER PUBLICATIONS

English Translation of International Preliminary Report on Patentability and Written Opinion of the International Searching Authority, PCT/EP2014/056353, dated Oct. 6, 2015.

*Primary Examiner* — John Walters
*Assistant Examiner* — James Triggs
(74) *Attorney, Agent, or Firm* — Bose McKinney & Evans LLP

(57) ABSTRACT

This disclosure relates to an automatic concrete pump comprising a support structure, which is mounted on a vehicle, for a concrete distributing mast and at least two supporting jacks which are pivotably joined to the support structure via an articulated joint, each articulated joint comprising two support plates made from a solid material, each having a bearing bore and protruding in a forked manner at a lateral distance from each other over the edge of a defining wall of the support structure, and having a hinge bolt which traverses the bearing bores. According to this disclosure, the defining wall which faces the hinge bolt is further away from the axis of the hinge bolt in the central area between the bearing plates than in the edge areas thereof which are adjacent to the support plates.

16 Claims, 1 Drawing Sheet

(51) Int. Cl.
*B66C 23/80* (2006.01)
*E04G 21/04* (2006.01)

(56) References Cited

U.S. PATENT DOCUMENTS

| | | |
|---|---|---|
| 5,961,145 A | 10/1999 | Schillinger et al. |
| 6,390,504 B1 | 5/2002 | Fetzer |
| 2010/0264635 A1 | 10/2010 | Fügel |
| 2013/0069353 A1* | 3/2013 | Fuegel .................. B66C 23/80 |
| | | 280/764.1 |

FOREIGN PATENT DOCUMENTS

| | | |
|---|---|---|
| DE | 36 11 269 A1 | 10/1987 |
| DE | 35 90 295 C2 | 5/1989 |
| DE | 195 31 697 A1 | 3/1997 |
| DE | 20 2007 002 114 U1 | 5/2007 |
| DE | 603 10 177 T2 | 10/2007 |
| DE | 10 2008 007 918 A1 | 8/2009 |
| DE | 10 2010 009 176 A1 | 8/2011 |
| DE | 10 2010 043 957 A1 | 5/2012 |
| EP | 0 357 988 B1 | 11/1992 |
| GB | 1 458 280 A | 12/1976 |
| WO | WO 86/00279 A1 | 1/1986 |

* cited by examiner

MOBILE CONCRETE PUMP AND PRODUCTION METHOD

RELATED APPLICATIONS

This application is a continuation of PCT/EP2014/056353, filed Mar. 28, 2014, which claims priority to DE 10 2013 205 888.8, filed Apr. 3, 2013, both of which are hereby incorporated herein by reference in their entireties.

BACKGROUND

The invention relates to a mobile working machine, in particular an automotive concrete pump, having a carrying structure, which is fixed to a vehicle, in particular for a concrete distributor boom, and at least two support legs that are hinge-jointed to the carrying structure via a respective hinge point, wherein each hinge point comprises two bearing plates made from solid material, each provided with a bearing bore and projecting in a forked manner at a lateral distance from each other over the edge of a delimiting wall of the carrying structure, and a hinge pin extending vertically through the mutually aligned bearing bores. The invention additionally relates to a method for producing a hinge point for the support legs of such a mobile working machine.

The hinged coupling of swivel legs to boom pedestals of automotive concrete pumps is similar in its construction to two links of a bicycle chain that are connected to each other via a pin. In this case, the swivel leg or support leg constitutes one "chain link," the boom pedestal or carrying structure constituting the other. The two parts are connected to each other by the hinge pin such that it is possible for the legs to be swiveled out laterally, about the vertical pin axis. Unlike the bicycle chain, the hinged joint of the swivel leg and the boom pedestal is subject to transverse force and moments transversely in relation to the joint, i.e., in the vertical direction. Accordingly, the bearing link plates are constituted by bearing plates made from solid metal, which conventionally project in a forked manner over a vertical delimiting wall, such that the production requirement is also reduced in comparison with multi-part box-type structures with inserted bushings.

In this context, it must be taken into account that the bearing bores for the swivel-leg pin are usually made in the link plates of the boom pedestal by means of so-called machining centers. These centers are equipped with a suitable drill or milling cutter that is held by a chuck and driven by means of a motor. The tool receiver together with the drive in this case occupies considerably more space than the tool itself. The size of the tool receiver would not matter if the bores were made in the link plates of the boom pedestal from above or from below, since there is sufficient space remaining for the machining appliance above or below the boom pedestal. However, such a procedure would mean rotating the boom pedestal by 180°, since machining centers are very limited in their tool stroke, and therefore the stroke is not sufficient for making the bore from above or below. Rotating the boom pedestal, in turn, means correspondingly elaborate and expensive equipment for fixing the component, or inaccuracies caused by the drilling itself as the bore is being made. However, if the machining appliance moves in the inner region between the link plates of the boom pedestal, and from there machines at least one of the two bearing bores, the hinge pin can be located only so close to the carrying structure of the boom pedestal that there still remains sufficient space for the machining appliance.

SUMMARY

Proceeding from this, this disclosure improves the working machines and production methods known in the prior art, and with simple means creates a transfer of force, that is as direct and sparing of material as possible, into the carrying structure fixed to the vehicle.

This disclosure is based on the concept of minimizing the distance of the hinge pin from the locations at which force is transferred into the carrying structure. Accordingly, it is proposed according to this disclosure that the delimiting wall facing toward the hinge pin have a greater distance from the axis of the hinge pin in its middle region, between the bearing plates, than in its edge regions that are adjacent to the bearing plates. This enables the projection of the bearing plates over the carrying structure of the boom pedestal to be made as small as possible, without impairing the required accuracy in the production of the bearing bores. Owing to the hollow contour of the delimiting wall, an additional working space is kept free for the machining appliance, while the bearing bores can be created with little projection on the carrying structure. As a result, it is also possible to dispense with oversized components for load bearing, which adversely affect the machine weight. Advantageously, the same construction method can also be applied on the support leg itself, although in this case the demands are not as high, in comparison with the boom pedestal, owing to the smaller dimensions of the components, at least in two dimensions.

Advantageously, the delimiting wall has a concave or angular hollow contour facing toward the hinge pin, such that, in the intermediate region between the bearing plates, there is sufficient working space for producing the bearing bores by machine.

A further structural simplification can be achieved in that the delimiting wall has two wall parts that taper toward each other at an obtuse angle, wherein the wall parts delimit a free space that is triangular in cross section.

In respect of design, it is additionally advantageous if the delimiting wall is welded to an upper flange and a lower flange, as a box-type structure, and if the bearing plates are rigidly fastened to the upper and the lower flange.

To simplify production, it is advantageous if the bearing bore is formed, by means of a drilling or milling-cutting tool, in the solid material of the bearing plate.

Advantageously, the bearing plates, as solid metal plates, have a thickness of more than 20 mm, in particular more than 40 mm. The occurring forces and moments can thus be absorbed in a simple design.

In terms of a direct transfer of force, it is also favorable if the distance between the edge of the bearing bores and the delimiting wall is less than the diameter of the bearing bores.

In a further advantageous design of the hinged joint, the swivel legs are hinge-coupled to the hinge pin via respectively two bearing link plates, wherein the bearing plates and bearing link plates overlap each other laterally in pairs.

A particularly preferred aspect or variant of this disclosure consists in that the hinge pin has a lesser diameter in its middle region, between the bearing plates, than in its end portions that extend through the bearing plates. Owing to the centrally tapered, preferably double-cone design, a structural form is achieved that is commensurate with the occurring loads and that is sparing of material, while at the same time an additional free space is created for the fitting of functional parts, for example swivel sensors.

In respect of the method, in the machining of at least one bearing plate, the tool head is guided such that it engages in a free space between the edges of the delimiting wall that has a hollow contour. An optimized hinge point, having the advantages already mentioned above, can thus be produced with precision.

Advantageously, the tool head, for the purpose of producing the first bearing bore, is moved in a first feed direction and, for the purpose of producing the second bearing bore, is moved in a second feed direction that is opposite to the first feed direction, in the region between the bearing plates.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

It should be understood that terms such as "horizontal" and "vertical" appearing in this disclosure are used to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "support leg," "hinge point," "bearing plate," to name just a few, should be interpreted when appearing in this disclosure and claims to mean "one or more" or "at least one." All other terms used herein should be similarly interpreted unless it is made explicit that a singular interpretation is intended.

Figure 1:
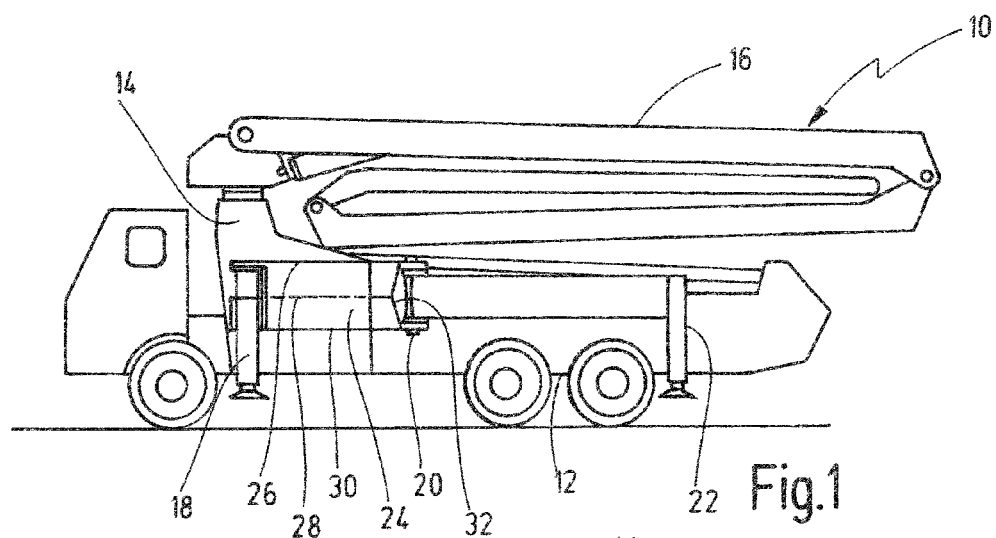
FIG. 1 is an automotive concrete pump, having rear support legs hinge-jointed to a hinge point, in a side view.

The automotive concrete pump 10 represented in FIG. 1 comprises a chassis 12, a carrying structure 14 mounted thereon that is fixed to the vehicle, a concrete distributor boom 16 that is mounted thereon so as to be rotatable about a vertical rotation axis, and two support or swivel legs 22 that are each hinge-jointed to the carrying structure 14 via a hinge point 20 and that can be swiveled out about a vertical swivel axis. The support legs 18, 20 can be moved out of the travel position shown into a support position that is farther from the longitudinal axis of the vehicle.

Each hinge point 20 is disposed at a box-type structure 24 that is constituted by three flanges 26, 28, 30 and wall plates welded thereto. In this case, a delimiting wall 32 that faces toward the hinge point 20 has a triangular hollow contour.

Figure 2:
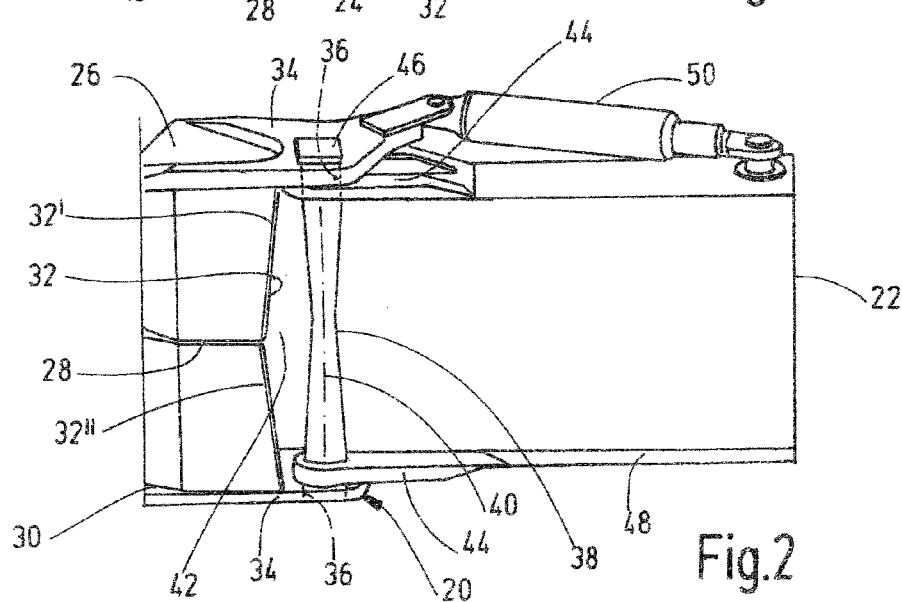
FIG. 2 is a perspective detail representation of the hinge point.

As best shown by FIG. 2, the hinge points 20 each have two bearing plates 34, which are welded on to the flanges 26, 30 and which, in their regions that project in a forked manner over the delimiting wall 32, are provided with bearing bores 36, through which a hinge pin 38 is passed. The bearing plates 34 are realized as solid metal plates and have a thickness of approximately 4 cm. The bearing bores 36 are in alignment with each other in the direction of the vertical axis 40 of the hinge pin 38. In this case, the distance between the edge of the bearing bores 36 and the upper and lower edge of the delimiting wall 32 is less than the diameter of the bearing bores 36.

The delimiting wall 32 has two wall parts 32', 32" that taper toward each other at an obtuse angle and that delimit a free space 42 that is triangular in cross-section. In its middle region, therefore, between the bearing plates 34, the delimiting wall 32 is at a greater distance from the axis 40 of the hinge pin 38 than in its edge regions that are adjacent to the bearing plates 34. In addition, in its middle region the hinge pin 38 has a lesser diameter than in its end portions that extend through the bearing plates 34. In this way, between the bearing bores 36 adjacent to the middle flange 28, a widened free space is created that is available for built-in functional parts, not shown, such as swivel sensors, and that allows the machine drilling work, explained in greater detail in the following, with little link plate projection.

As is also shown by FIG. 2, each swivel leg 22 has two bearing link plates 44, which in pairs laterally overlap the bearing plates 34 on the carrying structure side, and through which the hinge pin 38 extends. At the ends, the latter is held on the bearing plates 34 by means of end plates 46. The bearing link plates 44 are fastened to a horizontal support-leg arm 48, which can be swiveled, for example, by means of hydraulic cylinders 50.

Figure 3:
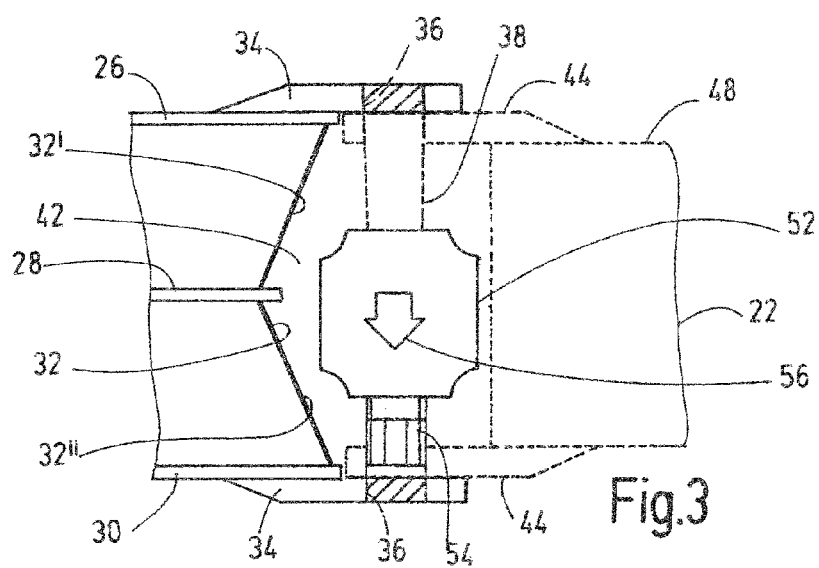
FIG. 3 is the production of the bearing bores of the hinge point by means of a drilling head, in a diagrammatic representation.

FIG. 3 illustrates the production of the bearing bores 36 in the solid material of the bearing plates 34 by means of a tool head 52 of a conventional machining center, not further shown. Such tool heads 52 are equipped with a suitable tool 54 (milling cutter, drill), which is held by a chuck and driven by a motor. The tool head 52 in this case occupies considerably more space than the tool 54 itself. The size of the tool head 52 would not matter if the bores were made in the bearing plates 34 of the carrying structure 14 from above or from below, since there is sufficient space remaining there for the machining appliance. However, such a procedure would mean rotating the carrying structure 14, or the boom pedestal, by 180°, since machining centers are usually very limited in their tool stroke, and therefore the stroke is not sufficient for making the bore from above and below. Rotating the boom pedestal, in turn, means correspondingly elaborate and expensive equipment for fixing the heavy component, or inaccuracies caused by the drilling itself as the bore is being made.

According to this disclosure, therefore, at least one bearing bore 36 is made from the inner region between the bearing plates 34. In this case, the tool head 52 engages in the widened free space 42 next to the central region of the delimiting wall 32, and moves the tool 54 downward close to the lower edge of the wall part 32″, as indicated by the arrow 56. The upper bearing bore can then be produced by rotating the tool head 52 by 180° in the opposite direction of feed, or alternatively from the top side, by downward feed. This procedure makes it possible to minimize the projection of the bearing plates 34 in the region of connection to the carrying structure 14 that is subjected to greatest load. The support-leg arm 48 with its bearing link plates 44 is then inserted such that the hinge pin 38 can be mounted so as to effect a hinged joint.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A mobile concrete pump, comprising:
   a carrying structure fixed to a vehicle and having a delimiting wall;
   a support leg hinge-jointed to the carrying structure via a hinge point, the hinge point comprising two bearing plates made from solid material, each bearing plate provided with a bearing bore, the two bearing bores forming a pair of mutually aligned bearing bores, the two bearing plates projecting in a forked manner at a lateral distance from each other over the delimiting wall; and
   the hinge point including a hinge pin extending vertically through the mutually aligned pair of bearing bores;
   wherein the delimiting wall faces the hinge pin and has a greater distance from the axis of the hinge pin in a middle region of the hinge pin, between the bearing plates, than in edge regions of the hinge pin that are adjacent to the bearing plates.

2. The mobile concrete pump as claimed in claim 1, wherein the delimiting wall has a concave or angular hollow contour facing toward the hinge pin.

3. The mobile concrete pump as claimed in claim 1, wherein the delimiting wall has two wall parts that taper toward each other at an obtuse angle, wherein the wall parts delimit a free space having a triangular cross-section.

4. The mobile concrete pump as claimed in claim 1, wherein the delimiting wall is welded to an upper flange and a lower flange and the bearing plates are rigidly fastened to the upper and the lower flange.

5. The mobile concrete pump as claimed in claim 1, wherein the bearing bores are formed by means of a drilling or milling-cutting tool in the solid material of the bearing plate.

6. The mobile concrete pump as claimed in claim 1, wherein the bearing plates comprise solid metal plates with a thickness of more than 20 mm.

7. The mobile concrete pump as claimed in claim 1, wherein the distance between the edge of the bearing bores and the delimiting wall is less than the diameter of the bearing bores.

8. The mobile concrete pump as claimed in claim 1, wherein the support leg is hinge-coupled to the hinge pin via two bearing link plates, wherein the bearing plates and bearing link plates overlap each other laterally in pairs.

9. The mobile concrete pump as claimed in claim 1, wherein the hinge pin has a lesser diameter in the middle region, between the bearing plates, than end portions of the hinge pin that extend through the bearing plates.

10. A mobile concrete pump, comprising:
    a carrying structure fixed to a vehicle and having a delimiting wall;
    a support leg hinge-jointed to the carrying structure;
    two bearing plates made from solid material, each bearing plate provided with a bearing bore, the two bearing bores forming a pair of mutually aligned bearing bores, the two bearing plates each having a fork projecting over the delimiting wall;
    a hinge pin extending vertically through the mutually aligned pair of bearing bores, wherein the hinge pin has a lesser diameter in a middle region thereof, between the bearing plates, than in in end portions of the hinge pin that extend through the bearing plates.

11. A method for producing a hinge point for the support legs of a mobile concrete pump as claimed in claim 10, the method comprising the following steps:
    placing a tool head of a machining center in a free space between the edges of the delimiting wall that has a hollow contour; and
    using the tool head to machine a bearing bore in a first one of the bearing plates.

12. The method as claimed in claim 11, wherein the tool head, for the purpose of producing the bearing bore in the first one of the bearing plates, is moved in a first feed direction and, for the purpose of producing a second bearing bore in the second bearing plate, is moved in a second feed direction that is opposite to the first feed direction.

13. The mobile concrete pump as claimed in claim 10, wherein the support leg comprises at least two support legs.

14. A method for producing a hinge point for the support legs of a mobile concrete pump as claimed in claim 1, the method comprising the following steps:
    placing a tool head of a machining center in a free space between the edges of the delimiting wall that has a hollow contour; and
    using the tool head to machine a bearing bore in a first one of the bearing plates.

15. The method as claimed in claim 14, wherein the tool head, for the purpose of producing the bearing bore in the first one of the bearing plates, is moved in a first feed direction and, for the purpose of producing a second bearing bore in the second bearing plate, is moved in a second feed direction that is opposite to the first feed direction.

16. The mobile concrete pump as claimed in claim 1, wherein the support leg comprises at least two support legs.

* * * * *